June 7, 1955
D. P. LITZENBERG
2,709,965
MOTOR DRIVEN PUMP
Filed Oct. 8, 1952
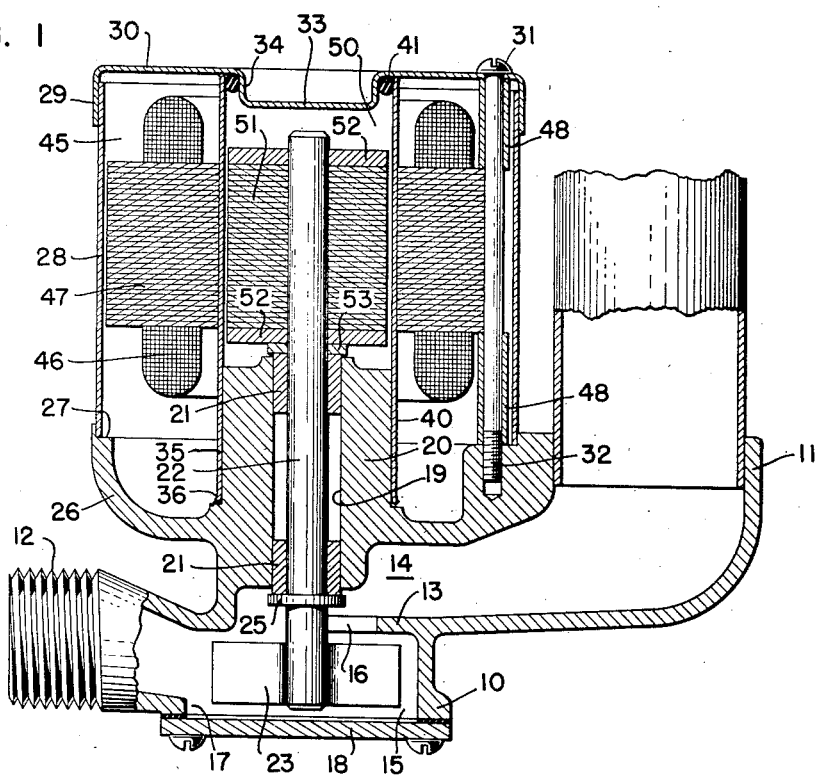
INVENTOR.
DAVID P. LITZENBERG
BY
ATTORNEY.

United States Patent Office 2,709,965
Patented June 7, 1955

2,709,965

MOTOR DRIVEN PUMP

David P. Litzenberg, Philadelphia, Pa.

Application October 8, 1952, Serial No. 313,652

5 Claims. (Cl. 103—87)

This invention relates to motor driven pumps.

It is the principal object of the present invention to provide a motor driven pump which is simple in construction yet sturdy and reliable in operation.

It is a further object of the present invention to provide a motor driven pump which has a relatively small number of parts and can be readily assembled.

It is a further object of the present invention to provide a motor driven pump having an isolated motor stator and motor rotor with an improved character of mounting of the isolating structure.

It is a further object of the present invention to provide a motor driven pump having a motor stator and motor rotor isolated by a cylindrical sleeve and in which the sleeve determines the alinement of certain of the housing portions, and the alinement of the movable parts with respect to the fixed parts is determined by a portion of the housing.

Other objects and advantageous features of the present invention will be apparent from the specification and claims.

The nature and characteristic features of the invention will be more readily understood from the following description, taken in connection with the accompanying drawings forming part hereof, in which:

Figure 1 is a vertical central sectional view showing a preferred embodiment of the invention taken approximately on the line 1—1 of Figure 2;

Fig. 2 is a top plan view of the motor driven pump shown in Fig. 1.

It should, of course, be understood that the description and drawings herein are illustrative merely and that various modifications and changes can be made without departing from the spirit of the invention.

Referring now more particularly to the drawings, in which a preferred embodiment of the invention is illustrated, a housing 10 is shown having an inlet connection 11 and an outlet connection 12, disposed on the opposite side of the housing 10 from the connection 11, the connections 11 and 12 being of suitable construction for attachment to the fluid lines in which the pump is employed.

The housing 10 is provided with a transverse wall 13 which separates an upper fluid inlet chamber 14 from a lower pumping or pump rotor chamber 15. The wall 13 has an opening 16 therethrough for the passage of fluid. The pump chamber 15 is in direct communication with the outlet connection 12 and the inlet chamber 14 is in direct communication with the inlet connection 11.

The housing 10 has an opening 17 in communication with the chamber 15, which is closed by a closure plate 18 secured to the housing 10 in fluid tight engagement in any desired manner.

The housing 10, longitudinally axially spaced from the opening 17, has a central hollow cylindrical portion 20 with a bore 19, the bore 19 having, in the interior thereof, spaced bearings 21 for supporting a shaft 22. On the lower or free end of the shaft 22, a pump impeller or rotor 23 is mounted and between the lowermost of the bearings 21 and the pump rotor 23 a spacer disc 25 is provided fixed on the shaft 22 to keep the shaft 22 in its proper axial position.

The housing 10 has an outwardly extending curved wall 26 with an interiorly formed terminal groove 27. A cylindrical motor housing 28 is provided preferably of sheet metal, seated at one end in the groove 27, the other end being in engagement with the inside of an outer downwardly turned edge 29 of an upper vertical closure plate 30. The plate 30 and the motor housing 28 are held in engagement with each other and the motor housing 28 is held in engagement in the groove 27 in any suitable manner, such as by spaced studs 31 having threaded ends 32 for engagement in the housing 10.

The closure plate 30, at the central portion thereof, has an inwardly offset portion 33 with a cylindrical connecting wall 34, for purposes to be explained.

The cylindrical portion 20 has an outer cylindrical surface 35, concentric and coaxial with the bore 19, terminating at a ledge 36. A cylindrical sleeve 40 is provided, of non-magnetic material, and preferably of stainless steel, is applied to the cylindrical portion 20 with a press fit so as to engage the surface 35 in fluid tight engagement and extends outwardly to the closure plate 30 in spaced relation at its outer end to the wall 34.

The mounting of the sleeve 40 with an appreciable portion of its length engaging the surface 35 provides rigidity of the sleeve 40 and permits the sleeve 40 to be used for alining the motor components. A suitable packing 41 is provided, preferably an O-ring, to provide a fluid tight seal between the interior of the sleeve 40 and the closure plate 30.

A motor stator chamber 45 is thus provided in the closed space bounded by the sleeve 40, the closure plate 30, the motor housing 28 and the wall 26. Motor windings 46 and field laminations 47 are provided within the motor stator chamber 45, the field laminations being held in axial position by the engagement therewith of sleeves 48 carried on the studs 31. The windings 46 are connected to any suitable source of alternating current by leads (not shown).

A motor rotor chamber 50 is thus also provided within the interior of the sleeve 40, bounded at the outer end by the closure plate 30 and at its inner end by the cylindrical portion 20.

Within the motor rotor chamber 50 a motor rotor 51 is provided, secured to the shaft 22 and may be of the short circuited type with end plates 52 and with a pressure ring 53 interposed between the lower end plate 52 and the upper bearing 21.

The mode of operation, will it is believed, be clear from the foregoing but may be summarized briefly.

Fluid supplied through the inlet connection 11 flows into the inlet chamber 14 and thence through the opening 16 into the pump chamber 15. The rotating action of the pump rotor 23 in the pump chamber 15 forces the fluid through the outlet connection 12. The rotation of the pump rotor 23 is effected by the action of the windings 46 in setting up a field for causing rotation of the motor rotor 51.

The initial and continued alinement of the working parts of the pump is assured by the rigidity of the sleeve 40 which serves as an interior wall for positioning the end closure plate 30 and from the closure plate 30, the housing 28, the studs 31, the sleeves 48 and the stator laminations 47.

I claim:

1. A motor driven pump comprising a unitary housing having a pumping chamber therein with inlet and outlet passageways in communication therewith, said housing having a central hollow cylindrical portion extending axially from said pumping chamber and a transverse wall extending outwardly from said cylindrical portion, said housing having an end opening axially alined with and oppositely disposed with respect to said cylindrical portion, a member secured to said housing for closing said end opening, a cylindrical sleeve in fluid tight engagement at one end with the exterior of said cylindrical portion, a closure member having an offset central portion closing the other end of said sleeve, a packing member interposed between said offset portion and said sleeve, a motor housing member interposed between said closure and said transverse wall, the space between said housing member and said sleeve providing a motor stator chamber and the space within said sleeve providing a motor rotor chamber, bearings in said cylindrical portion, a shaft journalled in said bearings, a motor rotor fixed on said shaft and disposed on one side of said bearings in said motor rotor chamber and accessible through said other end of said sleeve, and a pump impeller fixed on said shaft and disposed on the other side of said bearings in said pumping chamber and accessible through said end opening.

2. A motor driven pump comprising a unitary housing having a pumping chamber therein with inlet and outlet passageways in communication therewith, said housing having a central hollow cylindrical portion extending axially from said pumping chamber and a transverse wall extending outwardly from said cylindrical portion, said housing having an end opening axially alined with and oppositely disposed with respect to said cylindrical portion, a member secured to said housing for closing said end opening, a cylindrical sleeve mounted at one end on and supported by the exterior of said cylindrical portion in fluid tight engagement, a closure member in engagement with the other end of said sleeve, a packing member interposed between said closure member and said sleeve, a motor housing member interposed between said closure and said transverse wall, the space between said housing member and said sleeve providing a motor stator chamber and the space within said sleeve providing a motor rotor chamber, bearings in said cylindrical portion, a shaft journalled in said bearings, a motor rotor fixed on said shaft and disposed on one side of said bearings in said motor rotor chamber and accessible through said other end of said sleeve, and a pump impeller fixed on said shaft and disposed on the other side of said bearings in said pumping chamber and accessible through said end opening.

3. A motor driven pump comprising a unitary housing having a pumping chamber therein with inlet and outlet passageways in communication therewith, said housing having a central hollow cylindrical portion extending axially from said pumping chamber and a transverse wall extending outwardly from said cylindrical portion, said housing having an end opening axially alined with and oppositely disposed with respect to said cylindrical portion, a member secured to said housing for closing said end opening, a cylindrical sleeve mounted at one end on and supported by the exterior of said cylindrical portion in fluid tight engagement, a closure member having an inwardly offset central portion disposed within the other end of said sleeve, a packing member interposed between said inwardly offset portion and said sleeve, a motor housing member interposed between said closure and said transverse wall, the space between said housing member and said sleeve providing a motor stator chamber and the space within said sleeve providing a motor rotor chamber, spaced bearings in said cylindrical portion, a shaft journalled in said bearings, a motor rotor fixed on said shaft and disposed on one side of said bearings in said motor rotor chamber and accessible through said other end of said sleeve, and a pump impeller fixed on said shaft and disposed on the other side of said bearings in said pumping chamber and accessible through said end opening.

4. A motor driven pump comprising a unitary housing having a pumping chamber therein with inlet and outlet passageways in communication therewith, said housing having a central hollow cylindrical portion extending axially from said pumping chamber and a transverse wall extending outwardly from said cylindrical portion, said housing having an end opening axially alined with and oppositely disposed with respect to said cylindrical portion, a member secured to said housing for closing said end opening, a cylindrical sleeve mounted at one end on and supported by the exterior of said cylindrical portion, a closure member having an offset central portion with a wall in spaced relation to the other end of said sleeve, a packing member interposed between said central portion wall and said sleeve, a motor housing member interposed between said closure and said transverse wall, holding members for said closure member extending into said transverse wall, the space between said housing member and said sleeve providing a motor stator chamber and the space within said sleeve providing a motor rotor chamber, bearing members in said cylindrical portion, a shaft journalled in said bearing members, a motor rotor fixed on said shaft and disposed on one side of said bearing members in said motor rotor chamber and accessible through said other end of said sleeve, and a pump impeller fixed on said shaft and disposed on the other side of said bearings in said pumping chamber and accessible through said end opening.

5. A motor driven pump comprising a unitary housing having a pumping chamber therein with inlet and outlet passageways in communication therewith, said housing having a transverse wall portion and a central hollow cylindrical portion extending axially from said pumping chamber and a transverse wall extending outwardly from said cylindrical portion, said housing having an end opening axially alined with and oppositely disposed with respect to said cylindrical portion, a member secured to said housing for closing said end opening, a cylindrical sleeve mounted at one end on and supported by the exterior of said cylindrical portion in fluid tight engagement, a closure member having an inwardly offset central portion disposed within the other end of said sleeve, a packing member interposed between said inwardly offset portion and said sleeve, a motor housing member interposed between said closure and said transverse wall, the space between said housing member and said sleeve providing a motor stator chamber and the space within said sleeve providing a motor rotor chamber, holding members for said closure member and said housing member extending through said motor stator chamber and into said transverse wall, bearings in said cylindrical portion, a shaft journalled in said bearings, a motor rotor fixed on said shaft and disposed on one side of said bearings in said motor rotor chamber and accessible through said other end of said sleeve and a pump impeller fixed on said shaft and disposed on the other side of said bearings in said pumping chamber and accessible through said end opening.

References Cited in the file of this patent

FOREIGN PATENTS

| | | |
|---|---|---|
| 501,714 | Belgium | Mar. 31, 1951 |
| 997,390 | France | Sept. 12, 1951 |